J. E. STENZEL.
FIRELESS BROODER.
APPLICATION FILED OCT. 28, 1910.

996,291.

Patented June 27, 1911.
2 SHEETS—SHEET 1.

Witnesses:
Alfred Bakenhagen
Richard Sommer

Inventor
John E. Stenzel,
by Geyer Ropp
Attorneys

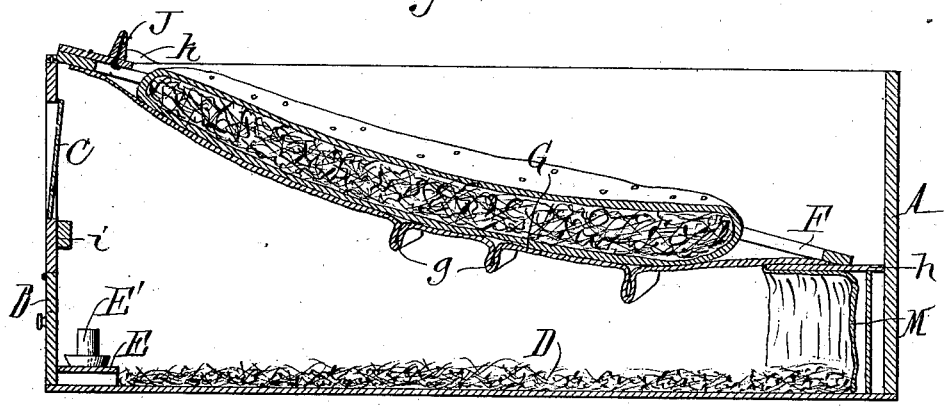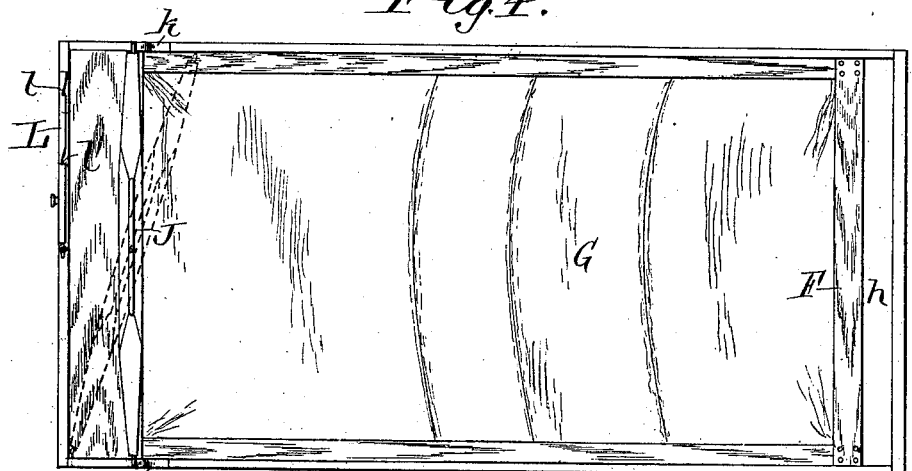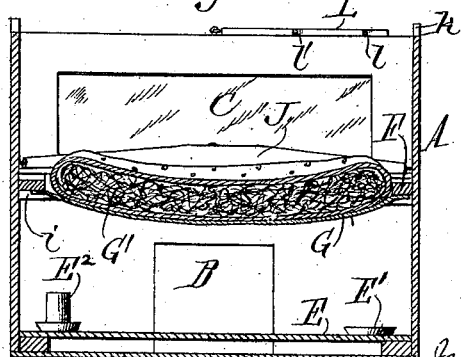

UNITED STATES PATENT OFFICE.

JOHN E. STENZEL, OF NORTH TONAWANDA, NEW YORK.

FIRELESS BROODER.

996,291.

Specification of Letters Patent. Patented June 27, 1911.

Application filed October 28, 1910. Serial No. 589,526.

*To all whom it may concern:*

Be it known that I, JOHN E. STENZEL, a citizen of the United States, residing at North Tonawanda, in the county of Niagara and State of New York, have invented new and useful Improvements in Fireless Brooders, of which the following is a specification.

This invention relates to the class of brooders having no means for artificially heating the apparatus and commonly known as fireless brooders.

The object of my invention is to improve the brooder with a view of admitting sufficient light thereto to induce the chicks to return into it and seek warmth and shelter under the hover-cover, while at the same time permitting the lower or brooding chamber of the apparatus to be isolated at night from the upper part or chamber containing the light-admitting window-pane, so as to protect the chicks from the cold which might otherwise be imparted to the air in the brooding chamber by the pane.

Figure 1:
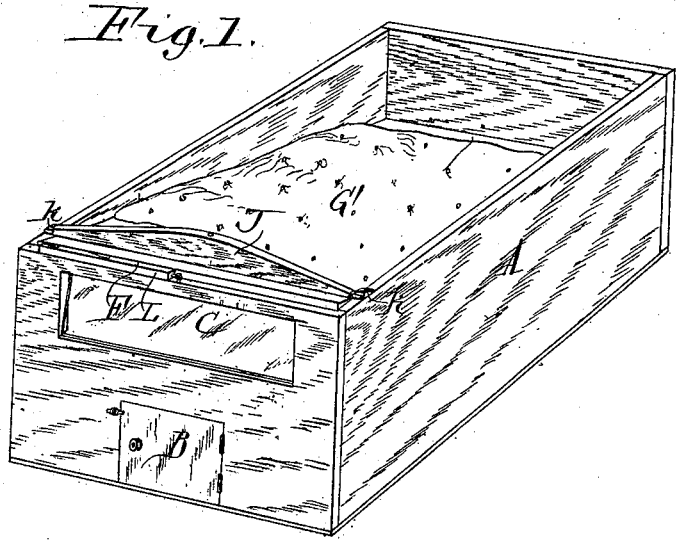
Figure 2:
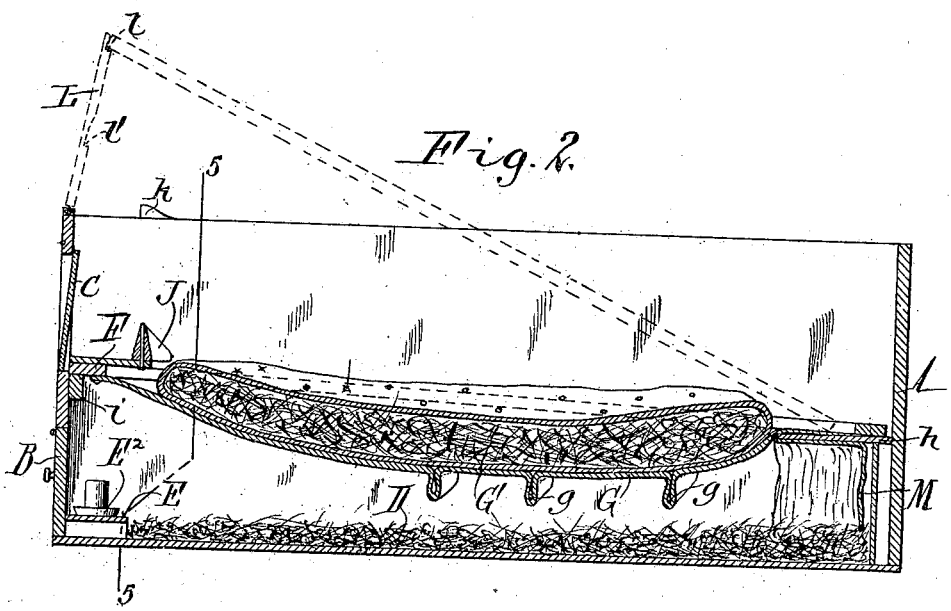

In the accompanying drawings consisting of 2 sheets: Figure 1 is a perspective view of the improved brooder. Fig. 2 is a longitudinal section thereof, showing the hover-frame lowered for night-use. Fig. 3 is a similar section showing said frame elevated for day-use. Fig. 4 is a top plan view of the apparatus corresponding to Fig. 3, omitting the hover-pad. Fig. 5 is a cross section in line 5—5, Fig. 2.

Similar letters of reference indicate corresponding parts throughout the several views.

The casing A of the brooder preferably has the form of an oblong box open at its top and having a tight bottom and tight end and side walls. It may be constructed of wood or other suitable material.

In its lower portion, preferably the lower portion of its front wall, the casing is provided with a suitable entrance-door B for the chicks, and in the upper portion of said wall with one or more window-panes C for admitting light into the brooder.

The bottom of the brooding chamber may be covered with litter D or any other suitable non-conductor of heat. At the front end of said chamber and resting on its bottom is a transverse board or platform E upon which the feed receptacle $E^1$ and the water receptacle $E^2$ are placed and which also serves to retain the litter in the brooder.

F indicates a vertically-movable frame arranged in the brooder and carrying a suitable hover-cover G and a pad or quilt $G^1$. This frame extends from side to side of the brooding-chamber and nearly from end to end thereof, so as practically to divide the brooder into upper and lower chambers when the frame occupies the position shown by full lines in Fig. 2. In the preferred construction shown in the drawings, the rear end of this frame rests loosely upon a ledge or support $h$ arranged at the rear end of the brooding chamber, at a suitable height above its bottom to permit the chicks to pass under the sagging hover-cover G. The front end of the frame F is adapted to be raised to a height above the pane C to admit light into the brooder, as shown in Figs. 1 and 3; or to be lowered to or below the base of the pane, as shown in Fig. 2, to separate the upper portion of the brooder containing said pane from the lower portion and thus protect the chicks from the cold transmitted into the upper portion of the brooder through the pane, particularly on cold nights. In the construction shown in the drawings, the hover-frame is supported in the last-mentioned or lowered position by a cleat or ledge $i$ arranged on the inner side of the front wall just below the window-pane; and the frame is supported in its elevated position by a pivoted cross bar or turn button J pivoted centrally to the upper side of the hover-frame and made somewhat larger than the internal width of the brooder-casing, so that the ends of said bar rest upon the side walls of the casing when it is turned at right angles to said frame, as shown in Figs. 1 and 4. In order to prevent the elevated hover-frame from sliding rearwardly and leaving an opening between it and the front wall of the casing, stops $k$ are arranged on top of the side walls near their front ends, against the front ends of which stops the ends of the turn button abut. In raising and lowering the hover-frame, its rear end slides freely upon the support $h$.

If desired, the front end of the hover-frame may be supported above the top of the brooder for ventilating or other purposes, as shown by dotted lines in Fig. 2. In the construction shown, the frame is supported in this position by a bar or strut L pivoted to the front wall of the brooder and having one or more shoulders $l$, $l^1$ for supporting the frame at different heights.

The hover-cover G may be made of canvas, burlap or any other suitable material and is preferably provided with depending flaps or curtains $g$ to better protect the chicks.

To protect the chicks from drafts at the rear end of the brooder, a curtain M may be suspended from the underside of the support $h$.

In the use of the brooder, the same is placed in a coop, barn or other sheltered place. During the day, the hover-frame is raised to the top of the window-pane C, as shown in Figs. 1 and 3. The light thus admitted, not only enables the chicks to find the water and feed on the first day, but also induces them to return into the brooder under the hover-cover on the following days when they become able to temporarily leave it, thus saving the time and trouble of putting them back into the brooder from time to time. The light also kills bacterial germs.

During the night, the hover-cover is lowered below the window pane, as shown in Fig. 2, to protect the chicks from cold, as hereinbefore described.

As the hover frame is loosely mounted on its supports, it can be readily removed, permitting all parts of the brooder to be thoroughly cleaned.

I claim as my invention:

1. A fireless brooder, comprising a casing provided in its upper portion with a window pane, a hover in the casing having one end thereof arranged adjacent to said window-pane and movable to a position above or below the same, whereby the hover, in its lower position, isolates the upper pane-containing compartment of the casing from the lower chick-compartment, and in its raised position admits light through the pane into said chick-compartment, and means for supporting the hover either above or below said pane.

2. A fireless brooder, comprising a casing provided in its upper front portion with a window-pane, a vertically-swinging hover-frame having its rear end supported in the casing while its free front end is arranged adjacent to said pane and movable to a position above or below the same, and means for supporting the front end of the hover frame at different heights.

3. A fireless brooder, comprising a casing provided in its upper front portion with a window-pane, a support arranged in the rear portion of the brooder above its bottom, a second support arranged in the front portion of the brooder above its bottom and below said window pane, and having its front end arranged adjacent to said pane, a hover-frame adapted to rest on said front and rear supports, and means for supporting the front end of the hover frame in a position above said window pane.

4. A fireless brooder provided in its front wall with a door and above said door with a window-pane, a cleat arranged on the inner side of said wall between the door and the window pane, a support arranged in the rear portion of the brooder, and a vertically-swinging hover-frame resting at its rear end on said rear support and adapted to rest at its front end on said cleat, whereby the hover, in its lower position, isolates the upper pane-containing compartment of the casing from the lower chick-compartment, and in its raised position admits light through the pane into said chick-compartment, and means for supporting the front end of the hover-frame above said pane.

Witness my hand this 25th day of October, 1910.

JOHN E. STENZEL.

Witnesses:
E. M. GRAHAM,
RICHARD SOMMER.